No. 724,309. PATENTED MAR. 31, 1903.
J. T. MARSH.
TRUCK FOR MOVING BUILDINGS.
APPLICATION FILED OCT. 29, 1902.
NO MODEL. 2 SHEETS—SHEET 1.
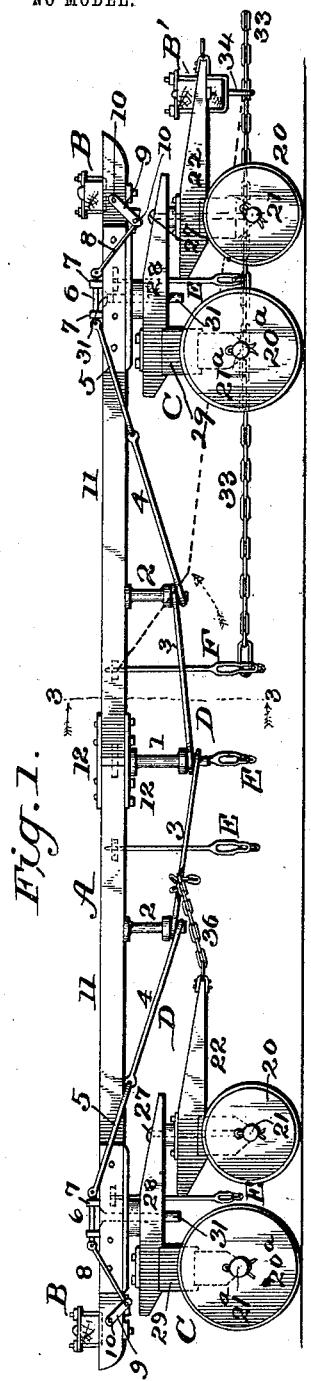
WITNESSES:
Jos. A. Ryan
Amos W. Hart
INVENTOR
John T. Marsh.
BY Munn & Co.
ATTORNEYS.

No. 724,309. PATENTED MAR. 31, 1903.
J. T. MARSH.
TRUCK FOR MOVING BUILDINGS.
APPLICATION FILED OCT. 29, 1902.
NO MODEL. 2 SHEETS—SHEET 2.

UNITED STATES PATENT OFFICE.

JOHN THOMAS MARSH, OF FARMER CITY, ILLINOIS.

TRUCK FOR MOVING BUILDINGS.

SPECIFICATION forming part of Letters Patent No. 724,309, dated March 31, 1903.

Application filed October 29, 1902. Serial No. 129,279. (No model.)

*To all whom it may concern:*

Be it known that I, JOHN THOMAS MARSH, a citizen of the United States, and a resident of Farmer City, in the county of Dewitt and State of Illinois, have made certain new and useful Improvements in Trucks for Moving Buildings, &c., of which the following is a specification.

It is the object of my invention to provide an improved truck for use in moving buildings and other structures and objects which shall combine maximum lightness with easy draft and great facility for adjustment of horizontal dimensions, also adaptation to be hauled either end forward, to be easily turned and guided, and which may be constructed at small cost, as well as adapted to be easily dismembered for shipping and storing in compact form.

Figure 3:
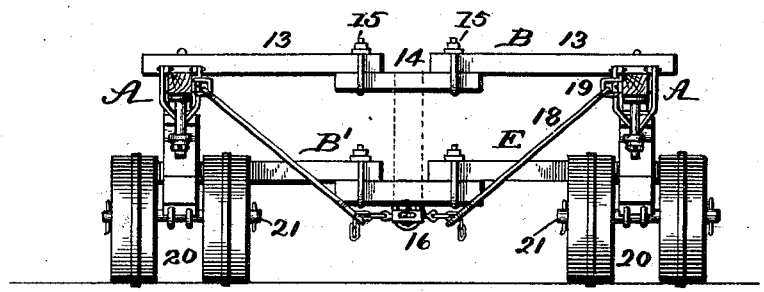
Figure 4:
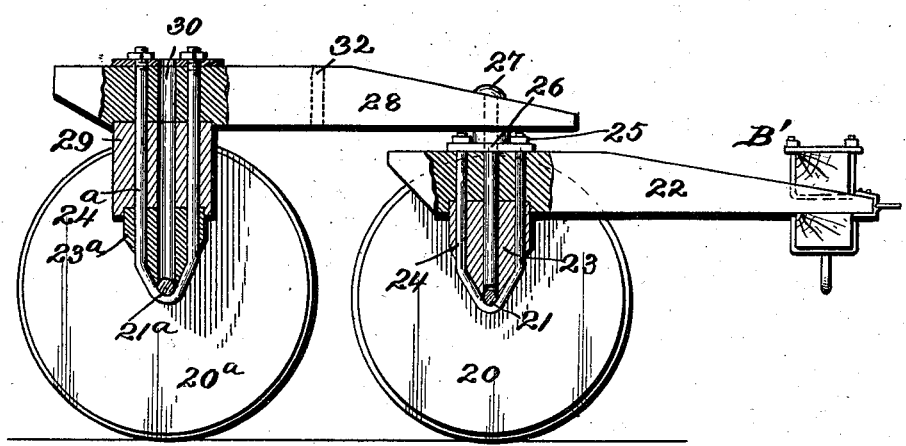
Figure 5:
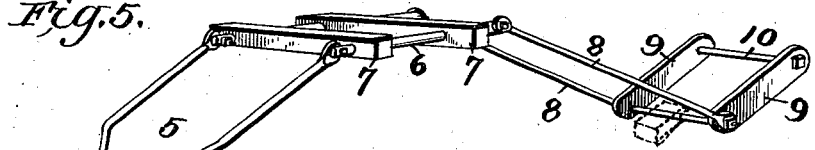
Figure 6:
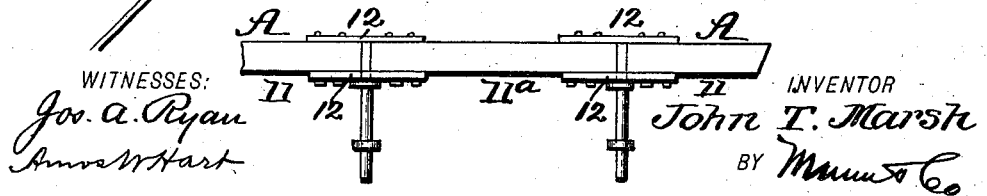

In the accompanying drawings, Figure 1 is a side view of my improved truck. Fig. 2 is a plan view of the same inverted. Fig. 3 is a vertical transverse section on the line 3 3 of Fig. 1. Fig. 4 is in part a side view and in part a section of one of the four trucks upon which the main frame is supported. Fig. 5 is a perspective view of the means for securing the ends of the body truss-rods to the side bars of the truck-frame. Fig. 6 is a detail side view of a portion of one of the side bars, illustrating adaptation of the same for lengthwise extension.

As shown in Figs. 1, 2, and 3, the horizontal frame of the truck is composed of side bars A and end bars B. There are four wheeled trucks C, one being arranged adjacent to each corner of the frame A B, but directly connected with and directly supporting the side bars A. As shown in Figs. 1 and 3, the end bars B are bolted upon the side bars A, which extend beyond the trucks. Each of the side bars is provided with an underneath truss D, which is composed of a series of rods and king-posts, as will be now described. There are three king-posts 1 2 2, which are pendent from each side bar, as shown in Fig. 1. Each of the king-posts has a collar or shoulder, and the portion which projects below the same is reduced. The truss-rod D comprises rods 3, which connect the king-posts, and jointed rods 4 5, which extend to each of the outer king-posts 2 to the devices which attach it to the side bar A. As shown in Fig. 5, the part 5 is bail-shaped and is pivoted to two parallel rods 6, which pass through horizontal bars 7, that lie loose upon the top of the sill A, as shown in Fig. 1. Parallel rods 8 (see Fig. 5) are connected with the other ends of rods 6, and these in turn are connected with short plates 9, which are connected by the cross-bolts 10, and thus form a sort of bridle or clevis, which is permanently attached to the end of the side bar directly beneath the crossbar B. In other words, one of the cross-bolts 10 passes through the side bar A and the other extends beneath it. The tension of the body truss-rod D as a whole is regulated by the application of transversely-grooved wedges beneath the loose bars 7 or otherwise, as judgment may suggest. It will be noted that the rods 3 and 4 are provided with eyes adapted to pass over the reduced ends of the king-posts 1 and 2, and are thus easily detachable.

As shown best in Fig. 1, each of the side bars A is formed of two parts 11 11, which are connected detachably by means of cleats or splices 12, secured to the meeting ends of the parts 11 by screw-bolts. The center king-post 1 is provided with a tenon which passes through the lower cleat 12. This construction and combination of parts enables the two portions 11 of the side bars to be easily detached when it is desired to store or ship the apparatus. In Fig. 6 I illustrate the insertion of another bar or beam 11ª between the two parts 11 for the purpose of extending the length of the truck-frame. Cleats or splice-plates 12 are, however, employed as before to connect the several parts. It is obvious that any desired length of intermediate bar 11ª may be employed, and thus the length of the truck may be regulated at will. In order to provide for similar extension or expansion of the truck-frame laterally, the end bars B are made in three parts 13 13 and 14, the latter being a splice-bar, as shown in Fig. 3, and secured underneath the parts 13 by clevises 15. It is apparent that by the employment of different lengths of such splice-bars 14 the width of the truck-frame as a whole may be varied at will, as required, to accommodate the frame to buildings of different sizes. When a building or other structure is to be moved, it is suitably jacked up, and the truck being placed thereunder the building is lowered until it rests parallel upon the truck-frame A B. It is generally requisite that the building shall be supported at points intermediate of the frame-bars A B, and for this purpose I employ a series of supports E, (see Figs. 1, 2, and 3,) which are constructed as follows:

Referring particularly to Fig. 2, 16 indicates a turnbuckle, 17 chains connected with the ends thereof, and 18 rods which are provided with an eye at each end and pivotally attached at 19, Fig. 3, to the side bars A. The inner eyes of the said rods 18 are elongated to form keyhole-slots, whereby they are adapted to engage with the links of the chains 17. Thus the chains being drawn through the larger portions of the slots and then carried outward into the smaller portions of the same they will be locked securely. By this means the chains may be taken up or let out as required and corresponding to the lateral adjustment of the side bars A. The supports or bridles E hang in the position shown in Fig. 3, and in practice blocks $x$ (indicated in such Fig. 3, dotted lines) are set upon the supports E, and their upper ends bear against some portion of the base-frame of the building which is to be transported. For the purpose of binding and securing the blocks $x$ in place the turnbuckles 16 are rotated. The lower end of the blocks $x$ may be recessed or forked to adapt them to keep their place upon the parts E. Thus by the supplemental devices E and $x$ the building is firmly supported in its central longitudinal portion.

The wheels 20 and $20^a$ of the several trucks proper are preferably constructed of solid wooden cylinders bound by means of an iron or steel tire. They are preferably sawed from the body of a tree of suitable size, and their width is considerable, so that the wheels may pass easily over soft ground. The front wheels 20 are somewhat smaller than the rear wheels $20^a$. (See Fig. 1.) Both sets of wheels are mounted in pairs upon axles 21 $21^a$ and secured by a cotter-pin, as shown. As shown in Fig. 4, a short tongue or pole 22 is attached to the forward axle 21, being suitably supported upon a block 23, which is secured by means of a clevis 24, which passes around the axle and through vertical holes formed in the block, screw-nuts 25 being applied on the upper side of the tongue and serving also to secure in place a plate 26, having a circular boss whose function is practically that of a fifth-wheel. A pivoted bolt 27 passes down through a bolster 28 and the aforesaid tongue 22 and block 23. The bolster 28 connects the front and rear axles 21 $21^a$, it being connected with the rear axle $21^a$ by practically the same means as the tongue 22 is attached to the front axle 21—that is to say, a block $23^a$ rests on the axle $21^a$ and the clevis $24^a$ passes up through the same and also through a block 29, upon which the bolster 28 directly rests.

A central hole 30 is formed in the bolster, the block 29, and the block $23^a$, as shown, for the reception of a pivoted bolt similar to 27 in case it should be desired to dispense with two of the wheels of the truck, or, in other words, to employ two-wheeled trucks instead of four-wheeled ones. The side bars A of the truck-frame are pivoted upon the bolsters 28 of the respective trucks by means of bolts 31, (see Fig. 1,) which pass through holes 32 (see Fig. 3) in the bolsters 28. The front ends of the tongues or poles 22 are pivotally connected transversely by means of bars B', which are adapted for endwise extension in the same manner as the end bars B of the truck-frame proper. It is apparent that by this connection of the tongues 22 the latter must move together, or when one is turned to the right or left the other is also. In brief, this means enables the two forward trucks C to be turned and guided similarly.

For the purpose of hauling the apparatus I employ a chain 33, (see Figs. 1 and 2,) which passes through a loop 34 on the under side of the tongue-connecting bar B' and extends back to and connects with a draft bridle or device F, which is composed of a chain 35 (see Fig. 2) and eyebars 36, the latter being loosely connected with the side bars A at a point near their lengthwise middle. It is apparent that when tension or draft is applied to the chain 33 the slack of the device F will be taken up and it will be drawn into the position indicated by dotted lines, Figs. 1 and 2, and, further, that the tractive force will be applied equally to the two side bars A, and that if the team connected with the chain 33 be turned to the right or left the lateral leverage applied to the tongue-bar B' will cause the tongues 22 to be similarly turned in the same direction. In brief, the apparatus is hauled safely and accurately guided by means of the chain 33, arranged in the manner shown. As shown in Figs. 1 and 2, the tongues 22 of the rear trucks are connected with the body truss-rods D by means of chains 36. Thus the tongues of the rear trucks are always held in the same plane with the side bars A. It will be seen, however, that either truck may be made the front one by simply detaching the connecting-bar B' at one end and applying it to the tongues of the trucks at the other end, the chains 36 being first detached and the rear trucks turned about. It will be obviously necessary to also reverse the front trucks, so that they will occupy the same position as the rear trucks exhibit in Fig. 1. In brief, the apparatus is adapted to be hauled either end forward, it being only necessary to reverse the trucks and duly connect the tongues thereof with each other or with the main frame, as already described.

As thus constructed my improved truck is distinguished by lightness, strength, ease of manipulation and adjustment, and adaptation to be easily dismembered for storage or shipment.

Having thus described my invention, what I claim as new, and desire to secure by Letters Patent, is—

1. An improved truck for moving buildings, &c., comprising four trucks proper, a frame comprising side and end bars which are extensible in length, truss-supports for the side bars, and bridles or adjustable supports connecting the side bars, substantially as shown and described.

2. In a truck of the character described, the combination with the frame thereof, and trucks arranged at the corners and provided with tongues, of a bar connecting said tongues, and the hauling-chain having a sliding connection with said bar and connected with the side bars of the frame at a point intermediate of the trucks, substantially as shown and described.

3. In a truck of the character described, the combination with the four-square frame, and four trucks pivotally connected with the same at its corners and provided with tongues, of a front connecting-bar which is pivotally attached to the tongues of the front truck, the hauling-chain passing through a guide-loop of such connecting-bar, a transverse bridle connecting with the side bars and the hauling-chain and means for securing the tongues of the rear trucks in a plane parallel to those of the side bars, substantially as shown and described.

4. The combination with the frame of the apparatus, of trucks comprising a bolster, two axles having wheels as specified, blocks applied to said axles, a clevis securing the bolster to the rear axle and block, a tongue fixed upon the forward block and secured thereto by a clevis, and a pivot or king-bolt passing through the bolster and the tongue and adjacent block, substantially as shown and described.

5. The combination with the frame, a bolster, a rear axle and wheels, and a front axle and wheels, of a tongue which is secured to the front axle and pivotally connected with the bolster, and a front bar B' which pivotally connects the free ends of the said tongues, substantially as shown and described.

6. The combination with the side bars of the frame, of the truss hereinbefore described, comprising king-posts, connecting-bars 3, 4, 5, bridles applied to the ends of the side bars, movable bars 7 and rods 6 connected and arranged substantially as shown and described.

7. The combination with the side bars of the frame, comprising two parts, of an intermediate or extension part alined therewith, and cleats securing the same thereto, substantially as shown and described.

8. The combination with the side bars of the frame, of the building-supports E comprising a turnbuckle, chains, and bars provided with eyes adapted for detachable engagement with said chains and duly connected with the side bars, substantially as shown and described.

JOHN THOMAS MARSH.

Witnesses:
SOLON C. KEMON,
AMOS W. HART.